US00RE36334E

United States Patent [19]

Henning

[11] E Patent Number: Re. 36,334

[45] Reissued Date of Patent: Oct. 12, 1999

[54] TAMPER-EVIDENT TWIST-OFF CLOSURE

[75] Inventor: John C. Henning, Fairfield, Ohio

[73] Assignee: Product Investment, Inc.

[21] Appl. No.: 08/543,295

[22] Filed: Oct. 16, 1995

Related U.S. Patent Documents

Reissue of:

[64] Patent No.: 5,263,600
Issued: Nov. 23, 1993
Appl. No.: 08/946,872
Filed: Sep. 17, 1992

[51] Int. Cl.[6] ..... B65D 41/12

[52] U.S. Cl. ..... 215/328; 215/43; 215/295; 215/901

[58] Field of Search ..... 215/42–45, 295, 215/317, 318, 321, 324, 326–328, 341, 342, 325, 244, 245, 901; 220/318, 309, 320

[56] References Cited

U.S. PATENT DOCUMENTS

| | | |
|---|---|---|
| 468,226 | 2/1892 | Painter . |
| 1,485,136 | 2/1924 | House . |
| 1,673,485 | 6/1928 | Berge . |
| 1,693,117 | 11/1928 | McDonnell . |
| 1,796,728 | 3/1931 | Sharp . |
| 1,796,729 | 3/1931 | Sharp . |
| 2,014,033 | 9/1935 | Smith . |
| 2,069,075 | 1/1937 | Lunn . |
| 2,106,464 | 1/1938 | Meyer . |
| 2,173,785 | 9/1939 | Kniesche . |
| 2,304,826 | 12/1942 | Jackson . |
| 2,726,001 | 12/1955 | Cululi . |
| 2,776,065 | 1/1957 | Loretitsch . |
| 3,346,134 | 10/1967 | Leemann . |
| 3,868,038 | 2/1975 | Hadley . |
| 4,055,266 | 10/1977 | Amabili . |
| 4,114,775 | 9/1978 | Shinozaki . |
| 4,595,110 | 6/1986 | Herr . |
| 4,699,285 | 10/1987 | Perne et al. . |
| 4,726,483 | 2/1988 | Drozd . |
| 4,779,749 | 10/1988 | Geiger . |
| 4,782,969 | 11/1988 | Henning . |

*Primary Examiner*—Allan N. Shoap
*Assistant Examiner*—Robin A. Hylton
*Attorney, Agent, or Firm*—Wood, Herron & Evans LLP

[57] ABSTRACT

A tamper-proof closure for use with a bottle having a neck, a lip, and shelf surrounding the neck and a plurality of ramp sections. The closure includes a top wall, a skirt and a plurality of tabs extending from the bottom edge of the skirt. The tabs include first and second side edges and a transverse edge. The tab is longer adjacent to one side edge than the other. The ramp sections include an upwardly sloping portion of the shelf and a cam wall extending across the shelf from the neck to the outer edge of the shelf.

15 Claims, 3 Drawing Sheets

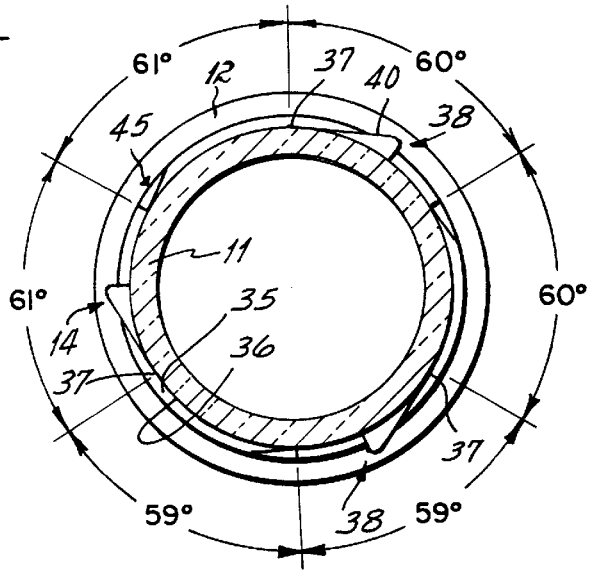
FIG. 5 AMENDED

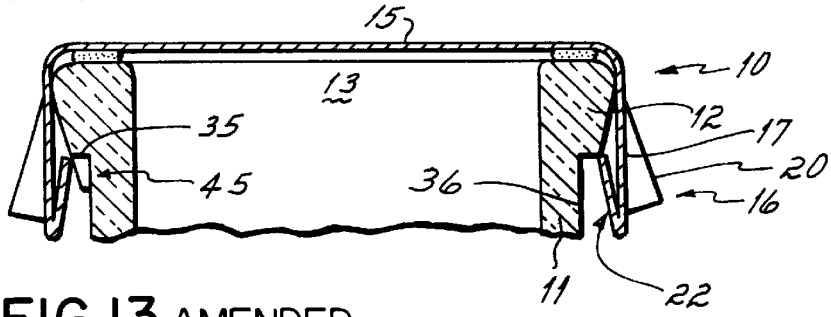
FIG. 13 AMENDED
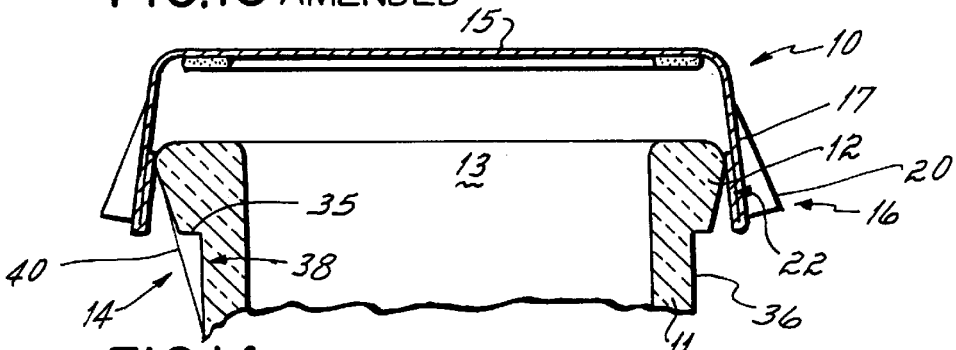
FIG. 14 AMENDED

TAMPER-EVIDENT TWIST-OFF CLOSURE

Matter enclosed in heavy brackets [ ] appears in the original patent but forms no part of this reissue specification; matter printed in italics indicates the additions made by reissue.

BACKGROUND OF THE INVENTION

The present invention relates to twist-off closures for bottles and other containers and is particularly directed to a tamper-evident closure which will provide a readily discernable indication that the container has previously been opened. In the past, a wide variety of closure constructions have been proposed to seal the tops of bottles and other containers. Some of these closure constructions have also been designed to provide an indication that the closure has been opened in order to provide protection against tampering with the container's contents. The intent of these closures is to prevent the practice of removing the closure, introducing a contaminant into the container's contents, and replacing the closure.

Among the tamper evident closures which have been proposed in the past, some depend upon the fact that the closure is deformed during removal. For example, Sharp U.S. Pat. Nos. 1,796,728 and 1,796,729, disclose caps for bottles in which the caps when originally placed on the bottles have a beaded configuration which is changed to a relatively planar surface when the cap is removed. A different approach is exemplified by Amabili U.S. Pat. No. 4,055,266. This patent discloses a twist-off cap incorporating one or more flanges, which are turned under a bead on the bottle. These flanges are provided with a series of lines of weakening so that as the cap is removed the flanges are distorted and either rupture or separate along the lines of weakening to provide a visual indication that the cap has been removed.

Each of these prior art closures constructions has been subject to one or more serious defects. For example, the deformable closures of the type shown in the Sharp patent can be reapplied to a bottle and caused to assume a shape close enough to the original shape that a casual consumer may not notice that the bottle had previously been open. Other proposed closures have been too complex or too cumbersome or incompatible with high speed capping equipment to prevent their adoption for use with soft drink, beer bottles and the like.

A completely different approach to providing a tamper evident closure is disclosed in my earlier U.S. Pat. No. 4,782,969 for "Twist-off Bottle Caps". The cap disclosed in that patent includes a flat top and a ribbed skirt which carries along its lower edge a plurality of narrow tabs. During the capping process, these tabs are bent upwardly and inwardly into engagement with a plurality of ribs formed on the neck of the container immediately below an endwise lip formed thereon. When in the sealed and locked position, the portions of these tabs in engagement with the ribs are in compression and serve to hold the cap tightly sealed against the end of the lip. The cap is removed by first twisting it, causing the tabs to be cammed outwardly by the ribs to a position in which they are free of the ribs, and then lifting the cap from the neck of the bottle. The cap cannot, as a practical matter, be used to reseal the bottle since the absence of some extremely complex mechanism there is no way in which the tabs can be forced inwardly to a position in which they reengage the ribs surrounding the neck of the bottle. While the closure construction shown in my earlier patent is effective to provide a tight closure for the container and to prevent undetected tampering with the container's contents, the closure is subject to the defect that for some intended uses an undesirably high amount of forces is required to twist off the cap.

SUMMARY OF THE INVENTION

The present invention is directed to an improvement of tamper proof twist-off closures of the type disclosed in my earlier U.S. Pat. No. 4,782,969. A tamper proof closure of the present invention is adapted to provide a tight seal for a bottle or other container and once removed cannot be reapplied to the bottle so that an unmistakable warning is given that a bottle has previously been open.

The present form of closure is adapted for use with a bottle of the type having a neck with a lip formed on its outer end. The lip includes a downwardly and inwardly sloping wall. A lower portion of the lip adjacent to its juncture with the neck incorporates a narrow, generally horizontal shelf. A plurality of angulated camming ribs are disposed at spaced intervals along the shelf and extend from the neck to the outer periphery of the shelf.

A closure constructed in accordance with the present invention comprises a circular top wall and a depending flange or skirt. The skirt is configured to form a plurality of spaced vertical stiffening ribs interconnected by webs. A plurality of tabs are formed along the lower edge of the flange between the ribs, each of these tabs includes two side edges interconnected by a transverse free tab edge. The free edge incorporates an outwardly projecting curved section adjacent to one side edge and an inwardly offset section extending from the curved section to the second side edge. As a consequence, the curved portion of the tab adjacent to the first edge extends outwardly beyond the portion of the tab adjacent to the second edge.

In use, the tabs are bent inwardly and upwardly during the capping operation s that the curved portions of the tabs engage the shelf formed on the lower portion of the container lip. The bent portions of the tabs are thus placed in compression and are effective to hold the cap tightly in place. The cap is removed by first rotating it. This motion causes the tabs to be rotated outwardly by the cams until the tabs are pushed of the shelf.

The present invention is predicated in part upon the discovery that the initial turning force required to loosen the cap is substantially reduced by providing a tab of the configuration described. It has been found that during the initial twisting movement of the cap, static friction causes the free edges of the tabs to initially remain stationary at their point of engagement with the shelf on the lip. This causes the tabs to cant, lengthening the distance between the shelf and the tab bend line and increasing the compressive force between the cap and the end of the bottle neck. The present tab configuration reduces this tendency since the round edge portion of the tab engagement with the shelf tends to roll along the shelf. Thereafter, the inwardly offset section of the tab engages the lip and since the length of this portion of the tab is reduced, some of the compressive force on the cap, or its liner, is relieved, lessening the torque required to twist-off the cap.

After the present cap has been twisted so that all of the tabs are forced off of the ledge, the cap can be removed from the bottle by merely lifting the cap from the end of the neck. After the cap has been removed, it cannot be relocked on the bottle since the tabs have been force outwardly in the close proximity with the skirt and cannot again be forced inwardly to a position in which they engage the ribs.

It is another aspect of the present invention to provide a novel container, which cooperates with the tamper proof cap to lessen the removal force. More particularly, a container of the present invention includes a neck having an outer wall with a pouring opening extending therethrough and an endwise lip surrounding the pouring opening. The lip includes a sloping peripheral wall extending downwardly and inwardly. A shelf, which is generally horizontal, i.e., is disposed at right angles to the peripheral surface of the neck, is formed adjacent to the junction of the lip and neck. A plurality of ramp sections are spaced about the periphery of the neck. Each of these ramp sections include a cam wall, which in the preferred embodiment is a substantially vertical wall and upwardly sloping sections of the shelf. The cam wall slants across the upwardly sloping portion of the shelf from the neck to a point adjacent to the outer periphery of the shelf. This cam wall is thus effective when the cap is twisted off to cam the tabs outwardly across the shelf to free the tabs from contact with the shelf to permit upward withdrawal of the cap. The upwardly sloping shelf wall permits the tabs to straighten out as they are cammed toward the outer edge of the shelf without binding or increasing the compressive force on the tabs.

In a preferred embodiment, two different types of ramps are provided. In one type of ramp, the cam walls extend from the neck outwardly to the outer periphery of the shelf. Ramps of this type are effective to merely push the tabs off the shelf. A second type of ramp includes a cam wall which extends outwardly beyond the periphery of the shelf to a position approximately in line with the outer diameter of the lip. These ramps are effective to displace tabs outwardly to a position adjacent to the periphery of the lip so that the lifting force on the cap is minimized.

In the preferred embodiment, the ramps are preferably unequally spaced about the periphery of the neck to prevent an excessive number of tabs being disposed in exactly the same position on various ramps. This unequal spacing of the ramps is advantageous both because it further reduces the twist-off torque required to loosen the cap and also because it reduces the number of tabs which fail to engage the shelf or ramp when the cap is applied to the bottle.

The invention will be more readily understood from a consideration of the following detailed description of the drawings illustrating a preferred embodiment of the invention.

BRIEF DESCRIPTION OF THE DRAWINGS

FIG. 5 is a cross-sectional view taken along line 5—5 of FIG. 4.

FIG. 13 is a *diametric* cross-sectional view similar to FIG. 12 showing the cap after it has been twisted during removal to force the tabs outwardly from contact with the shelf.

FIG. 14 is a *diametric* cross-sectional view similar to FIG. 12 in which the cap has been twisted to disengage the tabs from the lip and has been partially lifted from the bottle.

DETAILED DESCRIPTION OF THE PREFERRED EMBODIMENT

Figure 1:
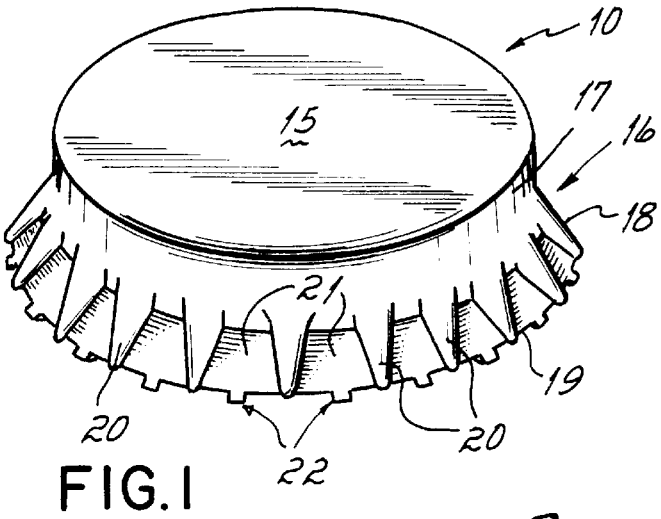
FIG. 1 is a perspective view of the cap embodying the present invention in its preferred condition before application to a bottle cap.
Figure 3:
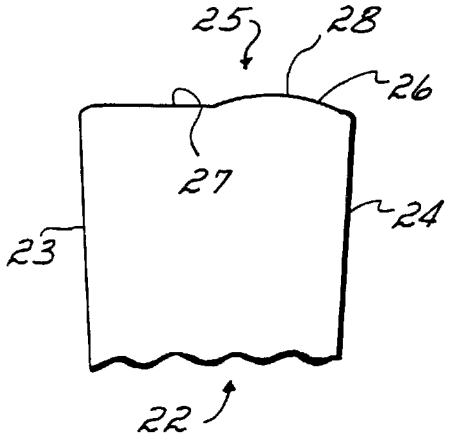
FIG. 3 is an enlarged elevational view of the encircled area 3—3 of FIG. 2 illustrating a locking tab in detail.
Figure 2:
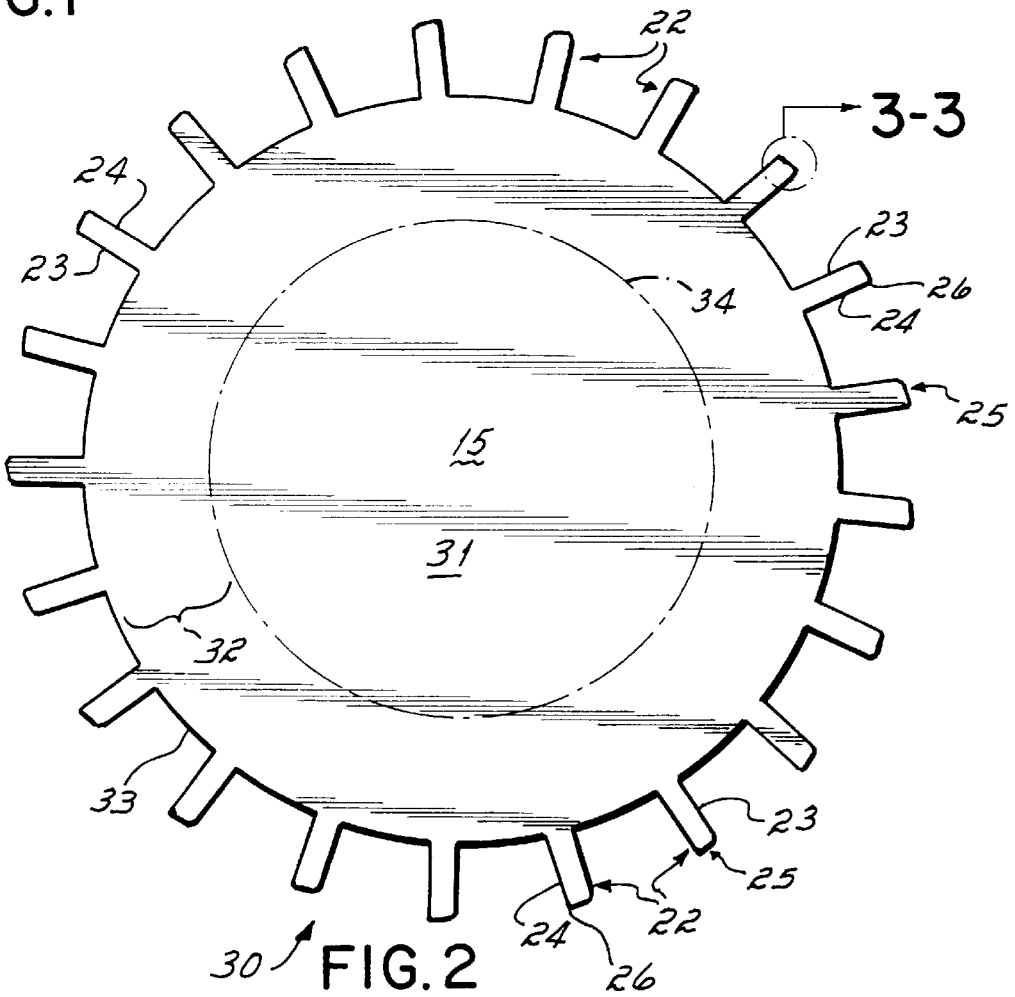
FIG. 2 is a top plan view of a blank for forming a cap of the present invention.
Figure 4:
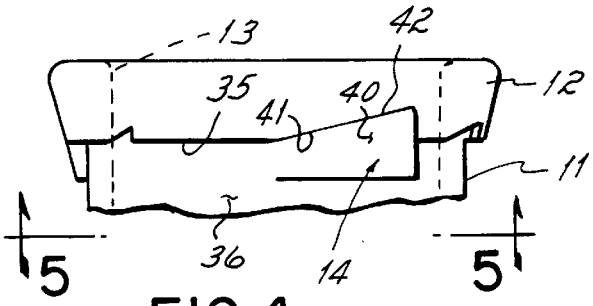
FIG. 4 is a side elevational view of a preferred form of a bottle embodying the present invention.

The overall construction of a closure or cap 10 constructed in accordance with the present invention is shown in FIG. 1. Details of the cap are shown in FIGS. 2 & 3. The cap is intended for use with bottles and other containers of the type described in detail below. In general, the container includes a neck, such as the neck 11 illustrated in FIG. 4. Neck 11 includes an endwise peripheral lip 12 surrounding a pouring opening 13. The neck further includes a plurality of ramp sections 14 which are described in detail below. The cap is placed over the end of the neck 11 and is locked in position surrounding lip 12 by generally conventional capping machinery. The cap is adapted to be removed by manually twisting the cap and thereafter lifting the cap from the end of the neck. Once removed, the cap cannot be relocked upon the neck without the use of very complicated machinery.

As shown in FIG. 1, cap 10 includes a generally circular top wall 15 and a depending peripheral flange or skirt 16. As is generally conventional with crown-type closures, the skirt includes a vertical wall portion 17 and a flared lower portion 18. The lower portion of vertical section 17 and flared section 18 are configured to form a plurality of radial ribs 20. These ribs which are of generally U-shaped cross-section, are spaced from one another and are interconnected by webs or valleys 21.

Cap 10 further includes a plurality of tabs 22 extending from the lower edge of the cap in the web area 21 intermediate ribs 20. The configuration of a preferred form of tab 22, is shown in FIG. 3. As there shown, the tab is an elongate flat member, having generally parallel spaced side edges 23 and 24. In a preferred embodiment these edges are not perfectly parallel but rather taper outwardly slightly from a tab width of 0.100" adjacent to the skirt to a width of 0.110" at the free edge of the tab. Assuming that the tab 22 shown in FIG. 3 is oriented so that it moves from right to left relative to the neck 11 as the cap is twisted for removal, edge 23 will be referred to as the leading edge and edge 24 will be referred to as the trailing edge. These edges are interconnected at the free end of the tab by transverse edge 25. Edge 25 is of asymmetrical configuration and includes an outwardly projecting curved section 26 adjacent to trailing edge 24 and a recessed horizontal section 27 extending from curved section 26 to leading edge 23. The portion of curved section 26 adjacent to section 27 forms a contact zone 28 adapted for engagement with a shelf formed on neck 14 as explained below. As is shown in FIG. 3, contact zone 28 is displaced from the center of tab 22 toward trailing edge 24. Preferably, the outermost part of zone 28 is located from 10–40% of the width of tab 22 from trailing edge 24. It is also apparent from FIG. 3 that the overall configuration of tab 22 is such that the tab is longer adjacent trailing edge 24, than it is adjacent to leading edge 23 and that contact zone 28 extends outwardly beyond the remainder of tab 22.

Figure 11:
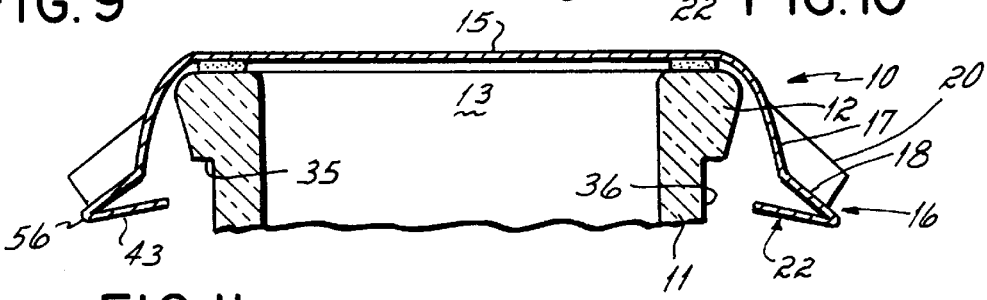
FIG. 11 is a vertical cross-sectional view through the bottle neck and cap showing a preformed cap as it is initially brought into contact with the pouring lip of the bottle.
Figure 12:
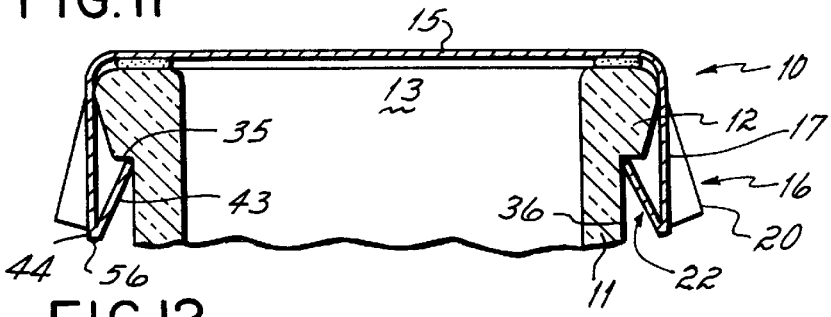
FIG. 12 is a cross-sectional view similar to FIG. 11 showing the flange of the cap in a position in which it has been forced inwardly so that the cap is sealed and looked onto the bottle.

Cap 10 is formed from a blank 30, illustrated in FIG. 2. blank 30 is preferably formed of a suitable metallic material such as thin steel or aluminum. It includes a generally circular section 31. The central portion of section 31 forms the top wall 15 of the cap while the annular surrounding portion 32 forms skirt 16 which includes vertical wall 17, flared skirt 18, ribs 20 and webs 21. Circumferential edge 33 of blank 30 forms the lower edge 19 of the preformed cap. Tabs 22 extend outwardly from circumferential edge 33, the tabs preferably being equally spaced about the circumference of the blank 30. When the blank 30 is formed into the cap configuration shown in FIG. 1, the annular portion 32 of the blank is bent downwardly along a circle indicated by dotted line 34 to form peripheral wall section 17 and skirt 18. The center of circular section 31 remains to form the top wall 15 of the cap. During the forming operation, ribs 20 are formed intermediate tabs 22. Tabs 22 ar bent inwardly into a generally V-shaped configuration forming an acute angle with web portions 21. As shown in FIG. 11, the angulation of the tabs 22 is such that the tabs slope upwardly from the horizontal with the transverse edges 25 of the tabs being disposed above the lower peripheral edge 19 of the webs 21

Cap 10 is particularly adapted for use with a novel bottle or other container having a neck as illustrated in FIGS. 4–8. As there shown, neck 11 includes an axial central pouring opening 13 and a peripheral lip 12 formed on the outer end of the neck. Lip 12 preferably includes a curved outer wall, which extends downwardly and inwardly and terminates in an annular horizontal shelf 35 disposed at the juncture of the lip and circumferential wall 36 of the neck. The width of shelf 35 can vary from about 0.010 to 0.30 inches or more. As shown in FIG. 5, the shelf 35 is interrupted at a plurality of circumferentially spaced locations by ramp sections indicated generally at 14. In the preferred embodiment, six ramp sections are provided, three of the ramps being of the configuration shown in FIG. 6, and three of the ramps being of the configuration shown in FIG. 7. It is, of course, apparent to those skilled in the art, that a fewer or a larger number of ramps may be provided if desired. One preferred ramp spacing is so illustrated in FIG. 5. In FIG. 5, the degree markings commence at the beginning point 37 of each ramp. It is to be noted that the ramps are not equi-spaced but rather that the spacing between the ramps varies from 59° to 61°. The purpose of this unequal spacing is to further reduce the twist-off torque required, since a maximum torque condition exists if an excessive number of tabs are located at exactly the same position on the cams. This is precluded by an unequal ramp spacing shown in FIG. 5.

Figure 6:
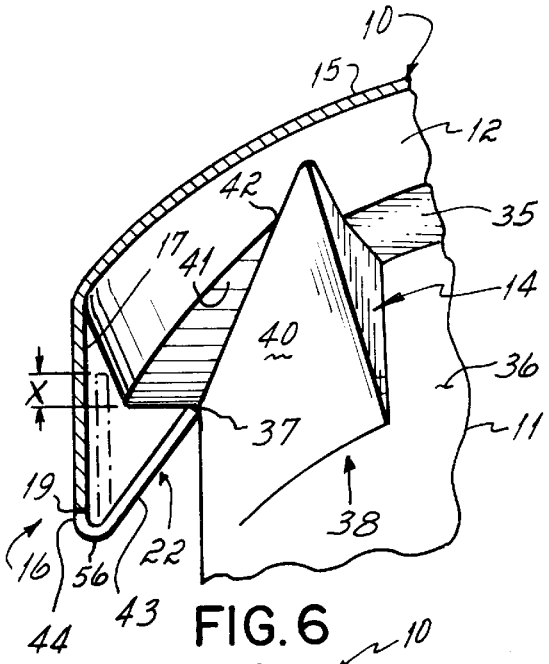
FIG. 6 is a perspective view looking upwardly toward the bottle lip and one preferred form of ramp configuration with a closure tab being shown in cross-section.

The ramp construction 38, shown in FIG. 6, includes a vertical wall section 40 which commences at the beginning point 37 where the wall meets the circumferential wall 36 of the neck. In the embodiment shown in FIG. 6, wall 40 extends approximately 30° along the peripheral wall 36 of the neck. The wall extends outwardly a few thousandths of an inch beyond the outer edge of shelf 35. The primary function of vertical wall 40 is to cam the tab 22 outwardly to a position in which it is disengaged from shelf 35 during the twisting/opening movement of the cap. The ramp construction also includes an upwardly sloping shelf section 41. This shelf section as well as the remaining portion of the shelf is disposed at a 90° angle to the peripheral wall 36 of the neck. It slopes upwardly from the horizontal surface of the major portion of shelf 35 to a point 42 where it is intersected by vertical wall 40. The rise in sloping section 41 is of an amount X equal to the difference in the vertical positions of contact zone 28 of tab 22 when the tab is pushed off the peripheral of ledge 35 at point 42 as compared to the position of zone 28 when the tab is locked. It will be apparent that when the cap is in the locked position, illustrated in FIG. 6, the bent over end wise portion 43 of tab 22 is in compression because zone 28 is in abutment with the ledge 35. This causes the vertical section 44 of the tab to pull the cap downwardly sealing the gasket against the top of the neck. As the cap is twisted (to the right in FIG. 6), section 43 is cammed outwardly by vertical wall 40 and as its angle with vertical section 44 decreases, the contact section 28 of the tab rises vertically due to the upward slope of shelf section 41. When the tab reaches juncture point 42, it is pushed off of shelf section 41, and then outwardly to a position in which it is generally parallel to vertical wall section 44 (FIG. 14) so that the cap can be lifted from the bottle. This minimizes the vertical lifting force required by the consumer to remove the cap.

Figure 7:
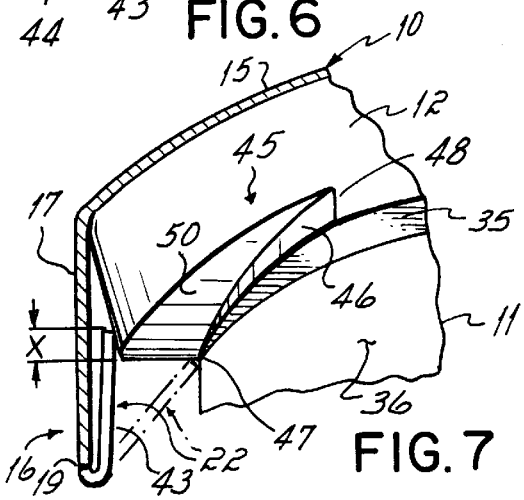
FIG. 7 is a view similar to FIG. 6 showing a modified form of ramp.

In the preferred embodiment, three ramp constructions 38 of the type illustrated in FIG. 6 are utilized and three ramps of the construction type 45 illustrated in FIG. 7 are utilized. The ramp construction shown in FIG. 7 comprises a vertical wall 46, which extends outwardly from a point 47 at which it joins circumferential wall 36 of the neck to a point 48, at which the wall 36 intersects the peripheral edge of upwardly sloping section 50 of shelf 35. As described in connection with the ramp construction of FIG. 6, the rise in shelf section 50 is substantially equal to the difference X in height of zone 28 of tab 22, as the tab is shifted from a position adjacent to the inner edge of the shelf at point 47 to a position adjacent to the outer edge of the shelf at point 48. Surface 50 extends at 90° to the peripheral wall 36 of the neck in the same manner as surface 41 described previously. Ramp 45 functions in generally the same manner as ramp construction 35 described above except that the vertical wall section is effective to cam the portion 43 of tab 22 only to a position just beyond shelf 35 (FIG. 13). It does not cam the wall section 43 an additional amount to bring it adjacent the outermost periphery of lip 12. The combination of a number of ramp constructions 38 with a number of ramp constructions 45, with the ramp constructions being unequally spaced about the periphery of the neck, functions to reduce both the amount of torque required to twist the cap free and to twist the cap tabs free from the shelf and to lift the cap free from the neck.

Figure 8:
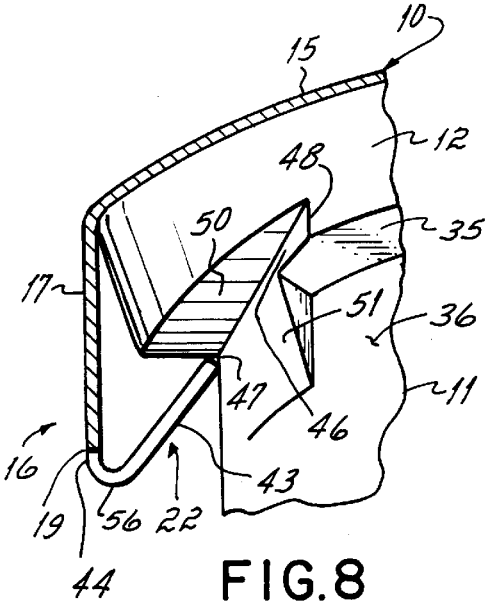
FIG. 8 is a view similar to FIG. 6 showing another modified form of ramp.

A modified form of ramp construction is shown in FIG. 8. This ramp construction is similar to the ramp construction 45 shown in FIG. 7 except that it also includes a wedged shaped cam wall 51 extending downwardly below vertical wall section 46. This vertical cam wall 51 functions to ensure that the tab 22 is cammed outwardly beyond the edge of sloping section 50 of the shelf and does not ride down beyond the lower edge of wall 46. The ramp construction shown in this figure functions in all other respects in the same manner as the ramp constructions 45 previously described.

The manner of applying and removing caps 10 is illustrated in FIGS. 11–14. It will be understood that the caps supplied to the bottler in the condition shown in FIG. 1. The cap is applied to the bottle by placing it over the end of neck 11 with the gasket in engagement with upper edge of the bottle neck. The cap is applied utilizing a generally conventional capping machine of a type well known in the art for applying crown type closures. Such machines include a vertically shiftable annular plunger which is lowered to fit over the cap and engage the depending flange 16. That flange is bent inwardly from the position shown in FIG. 11 to the fully closed position shown in FIG. 12. In addition to pressing the flange 16 downwardly, the closing machine presses tabs 22 inwardly. This forces the contact zones 28 of some of the tabs into engagement with shelf 35 or one or more of the slopping shelf sections forming part of one of the ramp sections. It is to be understood that the present cap is properly locked to and effective to seal the bottle even though not all of the tabs are locked against a ramp or shelf portion. As explained previously, when the tabs are bent inwardly, upwardly extending wall sections 43 of the tab are placed in compression while the outer sections 44 is placed in tension, causing a downward force to be exerted on the top of the cap pressing the gasket against the upper rim of the bottle neck to seal the bottle. It is to be understood that the tabs 22 are dimensioned so that they do not buckle but rather have sufficient compression strength to apply the necessary sealing load to the cap.

When the user desires to remove the cap 10, the cap is rotated counter-clockwise by hand. As the cap rotates, the tabs are cammed outwardly by vertical wall sections 40 and 46. As the tab portions 43 ar bent upwardly, contact zones 28 are free to move in this direction due to the rise provided by sloping shelf wall sections 41 and 50. Those tabs which cooperate with ram sections 38 are bent so that the inner sections 43 are shifted free from engagement with shelf 35 and also outwardly to a position beyond the periphery of lip 12. Those tabs which cooperate with ramp sections 45, are cammed outwardly beyond the periphery of shelf 35 and again the upward movement of contact zone 28 is permitted by the rise of shelf section 50. After the ca has been rotated to free the tabs from engagement with the shelf, its removal is completed by simply lifting it upwardly. When this is done, the free transverse edges 25 of the tabs, which have not already been cammed outwardly beyond the periphery of lip 12, engage the sloping surface of 5 the lip and are bent outwardly. As the cap continues to be lifted to the position shown in FIG. 14, the tabs 22 are bent outwardly to the position shown in which they clear the outer circumference of the lip permitting the cap to be lifted entirely free of the bottle.

Figure 9:
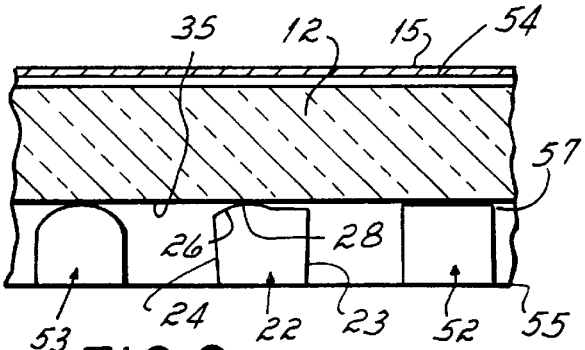
FIG. 9 is a schematic vertical sectional view through the lip of a bottle showing a tab of the present invention together with two tabs of different configuration, as the tabs would appear with the cap in its locked position.
Figure 10:
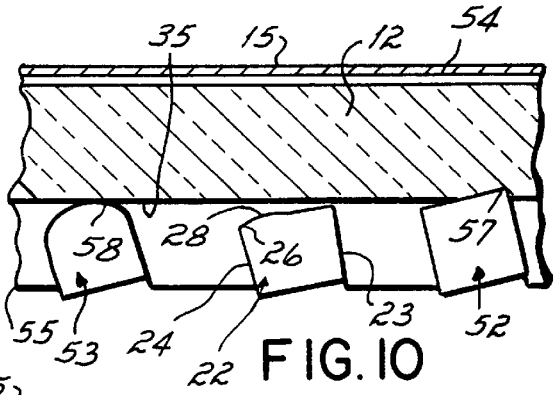
FIG. 10 is a view similar to FIG. 9, illustrating the tendency of the tabs to cant during the initial twisting movement of the cap.

The manner in which the configuration of tabs 22 contributes to minimizing the twist-off torque required to remove the cap 10, is illustrated in FIGS. 9 and 10. These drawings are highly diagrammatic views comparing the mode of operation of the present tab 2 with a square tab 52 somewhat similar to the prior art tab shown in my earlier U.S. Pat. No. 4,782,969, and a tab 53 having a rounded end symmetrical about the vertical axis of the tab. FIG. 9 illustrates the three tabs in their locked position in abutment with shelf 35 of lip 12. Line 54 represents the bottom surface of the top wall 15 of the cap while line 55 represents the bend line of the tabs, i.e., the apex 56 of the bent tabs as shown in FIG. 6. It is to be understood that in FIG. 9 a portion of each of the tabs is shown in compression, causing the cap to be pulled downwardly and compressing the gasket against the upper edge of the lip 12. As twisting movement of the cap commences the tabs move to the right. As shown in FIG. 10, there is a relatively large static friction between the shelf and portions of the tabs in engagement with the shelf 35. As a result, this portion of the tabs intends to remain stationary. The twisting of the cap skirt, however, tends to pull the lower ends of the tab along bend line 55 to the right. The tabs thus tend to cant, as illustrated in FIG. 10. As shown schematically in that view, corner 57 of tab 52 is forced upwardly against shelf 35. While, of course, the corner 57 would not actually penetrate the glass shelf, the spacing between ground plates 54 and the corner tends to decrease, increasing the compressive force on the gasket with a commuinute increase in twisting torque.

Hypothetical tab 53, with its symmetrical rounded end, also does not materially reduce the twisting torque. As with tab 52 the twisting movement of the cap causes the bend line 55 to move while the portion 58 of the tab 53 in contact with the shelf 35 remains stationary. This causes the tab to cant and the bend line to distort. While tab 53 represents a slight improvement over tab 52 because there is a rolling friction between its free edge 58 and shelf 35, the distance between the point of contact of the tab and bend line remains constant with no attendant reduction in twisting torque.

In the case of tab 22 of the present invention, contact zone 28 also has rolling contact with shelf 35. However, when the tab 22 is canted, as shown in FIG. 10, the vertical distance between contact zone 28 and bend line 55 is decreased, so that the pressure on tab 22, and the compressive force on the gasket is likewise decreased (even though zone 28 physically remains in contact with the shelf 35). This reduces the torque required to twist the cap.

After a cap 10 has been removed, tabs 22 remain bent upwardly generally in the position shown in FIG. 14. If an attempt is made to reseat the cap on the bottle, the cap may be placed over the bottle in the position shown in FIG. 14 and can be lowered until the gasket is brought into engagement with the upper edge of the bottle. However, even if an attempt were made to bend the tabs inwardly before replacing the cap when the cap is forced downwardly over the lip, tabs 022 will remain bent outwardly to an extent that they cannot be brought into engagement with shelf 35 or sloping shelf sections 41 or 50. Turning the cap in any direction will not cause the tabs to be reengaged with and locked against the shelf sections. This can be accomplished only with a relatively complicated piece of equipment not available to a person interested in tampering with the contents of containers. Consequently, a highly reliable tamper-proof twist-off closure is provided.

From the foregoing disclosure and the general principles of the present invention and the above description of a preferred embodiment, those skilled in the art will readily comprehend various modifications to which the invention is susceptible. Thus, for example, it is contemplated that the vertical ramp walls 40 and 51 can be formed in either a straight line or can be curved. It is contemplated that a greater or lesser number of tabs and/or ramp sections can be utilized from those shown in the preferred embodiment. Therefore, I desire to be limited only by the scope of the following claims:

I claim:

1. A tamper-proof cap for a container of the type having a neck with a central pouring opening and an outer lip surrounding the end of said neck and a shelf surrounding said neck adjacent to said lip, said cap comprising:

a top wall, a depending peripheral flange, said flange being configurated to form a plurality of vertical ribs and a plurality of webs interconnecting said ribs, tabs extending from said webs, each of said tabs having a first side edge and a second side edge, a transverse free edge interconnecting said side edges, and a centerline, said transverse edge being asymmetrical with respect to the said centerline of said tab, and said tab being longer adjacent to said first edge than second edge, and being bent inwardly and being dimensioned to engage said shelf on said bottle to apply a downwardly sealing force on said top wall.

2. The cap of claim 1 in which each of said tabs includes an outwardly projecting curved section portion adjacent to said first edge, the outermost portion of said curved portion comprising a shelf contacting portion, the transverse edge of said tab further including a recessed portion interconnecting said curved portion and said second edge.

3. The cap tab of claim 2 in which said shelf contacting portion is spaced from said first edge by a distance equal to approximately 10–40% of the width of said tab.

4. A container for use with a tamper-proof closure, said container comprising:

a neck, having an outer wall and a pouring opening therethrough, an end wise lip surrounding said pouring opening and meeting said neck at a juncture, said lip including a sloping peripheral wall extending downwardly and inwardly to a shelf surrounding said neck, said shelf having an outer edge, a plurality of ramp sections spaced peripherally about said shelf, each of said ramp sections comprising an upwardly sloping portion of said shelf, and a cam wall extending outwardly across the upwardly sloping portion of said shelf to said outer edge thereof.

5. The container of claim 1 in which said cam wall extends outwardly beyond said outer side edge of said shelf.

6. The container of claim 4 in which said ramp sections are disposed at unequal distances around the periphery of said neck.

7. The container of claim 4 in which a first plurality of said ramp sections include cam surfaces which terminate closely adjacent to said outer edge of said shelf, and a second plurality of ramp sections in which said ramp walls extend outwardly beyond said outer edge of said shelf.

8. The container of claim 4 in which said shelf is disposed closely adjacent to the juncture of said lip and said neck.

9. The combination of a container comprising a neck having an outer wall and the pouring opening therethrough, an endwise lip surrounding said pouring opening, and including a sloping peripheral wall extending downwardly and inwardly, a shelf surrounding said neck adjacent to said lip, said shelf having an outer edge, a plurality of ramp sections disposed about the periphery of said shelf, each of said ramp sections comprising an upwardly sloping portion of said shelf and a cam surface extending across said upwardly sloping portion of said shelf, and a temper-proof cap comprising a top wall, a depending peripheral flange, said flange being configurated to form a plurality of vertical ribs and a plurality of webs interconnecting said ribs, tabs extending from said webs, each of said tabs having a first side edge, a second side edge and a transverse edge interconnecting said side edges, each of said tabs being longer adjacent to said first side edge than said second side edge, said tabs being bent inwardly and being dimensioned to engage said shelf to apply downwardly sealing force on said top wall.

10. The combination of claim 9 in which each of said tabs includes an outwardly projecting curved section portion adjacent to said first edge, the outermost portion of said curbed portion comprising a shelf contacting portion, the transverse edge of said tab further including a recessed portion interconnecting said curved portion and said second edge.

11. The combination of claim 9 in which said shelf contacting zone is spaced from said first edge by a distance equal to approximately 10–40% of the width of said tab.

12. The combination of claim 9 in which said cam wall extends outwardly beyond said outer side edge of said shelf.

13. The combination of claim 9 in which said ramp sections are disposed at unequal distances around the periphery of said neck.

14. The combination of claim 9 in which a first plurality of said ramp sections include cam surfaces which terminate closely adjacent to said outer edge of said shelf, and a second plurality of ramp sections in which said ramp walls extend outwardly beyond said outer edge of said shelf.

15. The combination of claim 9 in which said shelf is disposed closely adjacent to the juncture of said lip and said neck.

* * * * *